(12) United States Patent
Kementsietsidis et al.

(10) Patent No.: US 12,045,209 B2
(45) Date of Patent: Jul. 23, 2024

(54) METHOD AND APPARATUS FOR SMART AND EXTENSIBLE SCHEMA MATCHING FRAMEWORK

(71) Applicant: GOOGLE LLC, Mountain View, CA (US)

(72) Inventors: Anastasios Kementsietsidis, San Mateo, CA (US); Jay Pandya, Fremont, CA (US); Chrysovalantis Anastasiou, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/771,182

(22) PCT Filed: Nov. 6, 2019

(86) PCT No.: PCT/US2019/060010
§ 371 (c)(1),
(2) Date: Apr. 22, 2022

(87) PCT Pub. No.: WO2021/091550
PCT Pub. Date: May 14, 2021

(65) Prior Publication Data
US 2022/0374399 A1 Nov. 24, 2022

(51) Int. Cl.
*G06F 16/21* (2019.01)
*G06F 16/25* (2019.01)
*G06F 16/28* (2019.01)
(52) U.S. Cl.
CPC .......... *G06F 16/211* (2019.01); *G06F 16/252* (2019.01); *G06F 16/284* (2019.01)

(58) Field of Classification Search
CPC .... G06F 16/951; G06F 8/427; G06F 16/9566; G06F 16/957; G06F 16/211;
(Continued)

(56) References Cited

U.S. PATENT DOCUMENTS

| 2003/0120651 A1* | 6/2003 | Bernstein | G06F 16/86 |
| 2015/0019576 A1* | 1/2015 | Seneski | G06F 40/149 707/755 |

(Continued)

OTHER PUBLICATIONS

The International Search Report (ISR) with Written Opinion for PCT/US2019/060010 dated Jun. 3, 2020, pp. 1-15.

*Primary Examiner* — Kuen S Lu
(74) *Attorney, Agent, or Firm* — McDonnell Boehnen Hulbert & Berghoff LLP

(57) ABSTRACT

A method may include (i) obtaining first data records structured in accordance with a first schema, (ii) determining, for the first schema, one or more first schema property values for each schema property in a set of pre-defined schema properties, (iii) determining, for a second schema, one of more second schema property values for each schema property in the set of pre-defined schema properties, (iv) providing, to a schema matching engine, first and second schema property values, where the schema matching engine contains schema mapping techniques and rules, where each rule suggests a schema mapping technique based on schema properties from the set of pre-defined schema properties, (v) applying the rules to select a schema mapping technique, (vi) transforming the first data records in accordance with the selected schema mapping technique, and (vii) providing the transformed first data records in a data structure in accordance with the second schema.

20 Claims, 8 Drawing Sheets

(58) Field of Classification Search
CPC .... G06F 16/252; G06F 16/284; G06F 16/254; H04L 51/046
See application file for complete search history.

(56) References Cited

U.S. PATENT DOCUMENTS

| | | | |
|---|---|---|---|
| 2015/0100541 A1* | 4/2015 | Li | G06F 16/254 |
| | | | 707/602 |
| 2016/0321307 A1* | 11/2016 | Dingman | G06F 16/25 |
| 2018/0150528 A1* | 5/2018 | Shah | G06F 16/254 |
| 2019/0303459 A1* | 10/2019 | Yan | G06F 16/35 |

* cited by examiner

METHOD AND APPARATUS FOR SMART AND EXTENSIBLE SCHEMA MATCHING FRAMEWORK

CROSS REFERENCE TO RELATED APPLICATION

This application is a U.S. national phase of International Application No. PCT/US2019/060010, filed Nov. 6, 2019, which is incorporated by reference herein in its entirety.

BACKGROUND

A schema is a blueprint that defines the layout and format of data records contained in a database, in memory, or in a file. For example, a database table may contain one or more data records and a schema may correspondingly define a logical grouping of one or more database tables. A schema may include all the implementation details necessary to store data records, such as the data types of the data records, constraints on the data records, foreign or primary keys associated with the data records, and so on.

Sometimes, it may be of interest to transform data records from being structured in accordance with a first schema to being structure in accordance with a second schema. For example, existing data records may be stored in a legacy database that structures data records in accordance with a legacy schema. If the legacy database is replaced by a new database that structures data records in accordance with a new schema, then the existing data records in the legacy database should be transformed to be structured in accordance with the new schema so that the existing data records can be properly stored within the new database.

SUMMARY

The present disclosure generally relates to a schema matching engine of a computing system. The schema matching engine may be configured to transform data records from being structured in accordance with a first schema to being structured in accordance with a second schema. Depending on properties associated with the (i) the data records, (ii) the first schema, and/or (iii) the second schema, the schema matching engine may select one or more schema mapping techniques to execute when transforming the data records.

In a first aspect, a computer-implemented method is provided. The method includes obtaining, by a parser executing on a computing system, a first schema and first data records that are structured in accordance with the first schema. The method also includes determining, for the first schema, one or more first schema property values for each schema property in a set of pre-defined schema properties. The method further includes determining, for a second schema, one of more second schema property values for each schema property in the set of pre-defined schema properties. The method additionally includes providing, by the parser and to a schema matching engine executing on the computing system, first and second schema property values for each schema property in the set of pre-defined schema properties. The schema matching engine may contain (i) a plurality of schema mapping techniques for transforming records from an initial schema to a target schema, and (ii) a set of rules, where each rule suggests at least one schema mapping technique from the plurality of schema mapping techniques based on at least one schema property from the set of pre-defined schema properties. The method further includes applying, by the schema matching engine, the set of rules onto the first and second schema property values to select at least one schema mapping technique from the plurality of schema mapping techniques. The method further includes transforming, by the schema matching engine, the first data records in accordance with the at least one selected schema mapping technique. The method additionally includes providing, by the computing system, the transformed first data records in a data structure in accordance with the second schema.

In a second aspect, a computing system is provided. The computing system includes a parser and a schema matching engine. The schema matching engine contains (i) a plurality of schema mapping techniques for transforming records from an initial schema to a target schema, and (ii) a set of rules, where each rule suggests at least one schema mapping technique from the plurality of schema mappings techniques based on at least one schema property from a set of pre-defined schema properties. The computing system also includes one or more processors configured to cause the computing system to carry out operations. The operations may include obtaining, by the parser, a first schema and first data records that are structured in accordance with the first schema. The operations may further include determining, for the first schema, one or more first schema property values for each schema property in a set of pre-defined schema properties. The operations may further include determining, for a second schema, one of more second schema property values for each schema property in the set of pre-defined schema properties. The operations may also include providing, by the parser and to the schema matching engine, first and second schema property values for each schema property in the set of pre-defined schema properties. The operations may additionally include applying, by the schema matching engine, the set of rules onto the first and second schema property values to select at least one schema mapping technique from the plurality of schema mapping techniques. The operations may also include transforming, by the schema matching engine, the first data records in accordance with the at least one selected schema mapping technique. The operations may additionally include providing, by the computing system, the transformed first data records in a data structure in accordance with the second schema.

In a third aspect, an article of manufacture is provided. The article of manufacture may include a non-transitory computer-readable medium having stored thereon program instructions that, upon execution by one or more processors of a computing system, cause the computing system to carry out operations. The operations may include obtaining, by a parser executing on the computing system, a first schema and first data records that are structured in accordance with the first schema. The operations may further include determining, for the first schema, one or more first schema property values for each schema property in a set of pre-defined schema properties. The operations may further include determining, for a second schema, one of more second schema property values for each schema property in the set of pre-defined schema properties. The operations may also include providing, by the parser and to a schema matching engine executing on the computing system, first and second schema property values for each schema property in the set of pre-defined schema properties. The schema matching engine contains (i) a plurality of schema mapping techniques for transforming records from an initial schema to a target schema, and (ii) a set of rules, where each rule suggests at least one schema mapping technique from the plurality of schema mappings techniques based on at least one schema property from the set of pre-defined schema properties. The operations may also include applying, by the schema matching engine, the set of rules onto the first and second schema property values to select at least one schema mapping technique from the plurality of schema mapping techniques. The operations may further include transforming, by the schema matching engine, the first data records in accordance with the at least one selected schema mapping technique. The operations may additionally include providing, by the computing system, the transformed first data records in a data structure in accordance with the second schema.

Other aspects, embodiments, and implementations will become apparent to those of ordinary skill in the art by reading the following detailed description, with reference where appropriate to the accompanying drawings.

DETAILED DESCRIPTION

Figure 1:
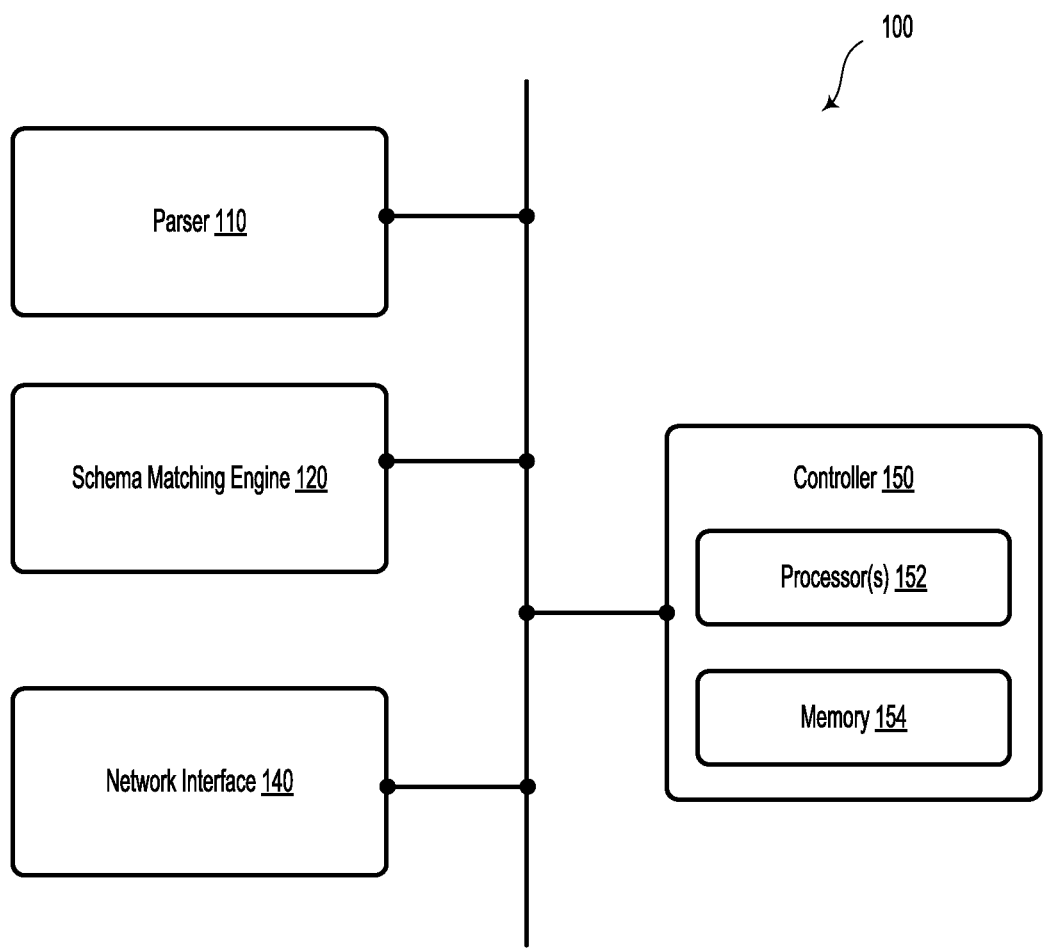
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Data records often need to be transformed from being structured in accordance with a first schema to being structured in accordance with a second schema. Also known as "schema mapping", such transformations may occur in a wide variety of settings. For example, if a machine learning model has a particular schema requirement for its input data, then data records should be transformed to be structured in accordance with the particular schema requirement before being passed to the machine learning model. As another example, if a legacy database is replaced by a new database that structures data in accordance with a new schema, then the existing data records in the legacy database should be transformed to be structured in accordance with the new schema. Other settings for schema mapping may also exist.

Generally speaking, a schema mapping is performed as follows: a schema transformation system provides a user with a list of pre-determined schema mapping techniques to choose from. Next, the user manually selects a schema mapping technique from the list. Then, the schema transformation system applies the selected schema mapping technique to transform data records from being structured in accordance with a first schema to being structured in accordance with a second schema.

But a problem with the procedure above is that the schema transformation system does not provide the user with any context regarding which schema mapping techniques are most appropriate with respect to the data records or the first and second schemas. Rather, the user naively selects a schema mapping technique without regard to the content of the data records or structural details of the first and second schemas. This may result in deficient transformations of the data records. For example, a naively selected schema mapping technique may map some data records to incorrect fields or may omit some data records, among other possibilities.

While the user may manually attempt to investigate the content of the data records or structural details of the first and second schemas to select an appropriate schema mapping technique, performing such a feat may be unduly complex. For example, the data records may number in the thousands or even millions, and thus manually examining the data records may be challenging. Furthermore, brute-force methods that attempt to test all schema mapping techniques may be computationally expensive and impractical. Additionally, aspects of the content or structural details may be overly difficult for the user to manually ascertain. For example, a user may find it painstakingly difficult to calculate an average string length across all the data records.

Some techniques described herein address these issues through a schema transformation system that automatically analyzes the content of the data records and structural details of the first and second schemas to inform a decision on which schema mapping techniques from a library of schema mapping techniques to select. It will be understood that the selected schema matching technique serves to control the operation of the computing system to transform the first data records into a data structure in accordance with the second schema. Hence, various implementations described herein provide for the generation of functional data (in the form of the selected schema mapping technique) which thus contributes to producing a technical effect. Advantageously, the need for a manually analysis of the content and structure is removed, allowing the schema transformation system to quickly ascertain which schema mapping techniques are most appropriate. Further, the embodiments described herein provide for an extensible framework that can incorporate new schema mapping techniques as they are developed, thereby further improving the capabilities of the schema transformation system. Other advantages are also contemplated and will be appreciated from the discussion herein.

II. Example Computing Systems

FIG. 1 illustrates computing system 100, in accordance with example embodiments. Computing system 100 may be an example schema transformation system that automatically analyzes the content of data records and structural details of the first and second schemas to inform a decision on which schema mapping techniques from a library of schema mapping techniques to select. In example embodiments, computing system 100 includes parser 110, schema matching engine 120, network interface 140, and controller 150, however in other embodiments, computing system 100 may include other components. In some embodiments, parser 110 and schema matching engine 120 may take the form of separate software modules executable by computing system 100. In other embodiments, parser 110 and schema matching engine 120 may be combined as a single software module executable by computing system 100. In some embodiments, computing system 100 may take the form of a desktop computing device, a server device, or a mobile computing device.

Network interface 140 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 140 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 150 may include one or more processors 152 and data storage 154. Processor(s) 152 can include one or more general purpose processors and/or one or more special purpose processors (e.g., digital signal processors (DSPs), tensor processing units (TPUs), graphics processing units (GPUs), application specific integrated circuits (ASICs), etc.). Processor(s) 152 may be configured to execute computer-readable instructions that are contained in data storage 154 and/or other instructions as described herein. Data storage 154 may include one or more non-transitory computer-readable storage media that can be read and/or accessed by processor(s) 152. The one or more non-transitory computer-readable storage media can include volatile and/or non-volatile storage components, such as optical, magnetic, organic or other memory or disc storage, which can be integrated in whole or in part with at least one of processor(s) 152. In some examples, data storage 154 can be implemented using a single physical device (e.g., one optical, magnetic, organic or other memory or disc storage unit), while in other examples, data storage 154 can be implemented using two or more physical devices. In example embodiments, processor(s) 152 may be configured to execute instructions stored in data storage 154 so as to carry out one or more operations, for example, the operations of method 500 or 600 as described below.

Parser 110 may be configured with one or more pre-defined record properties and/or one or more pre-defined schema properties. During operation, parser 110 may analyze an input schema and input data records structured in accordance with the input schema to determine record property values for the pre-defined record properties and/or schema property values for the pre-defined schema properties.

Figure 2:
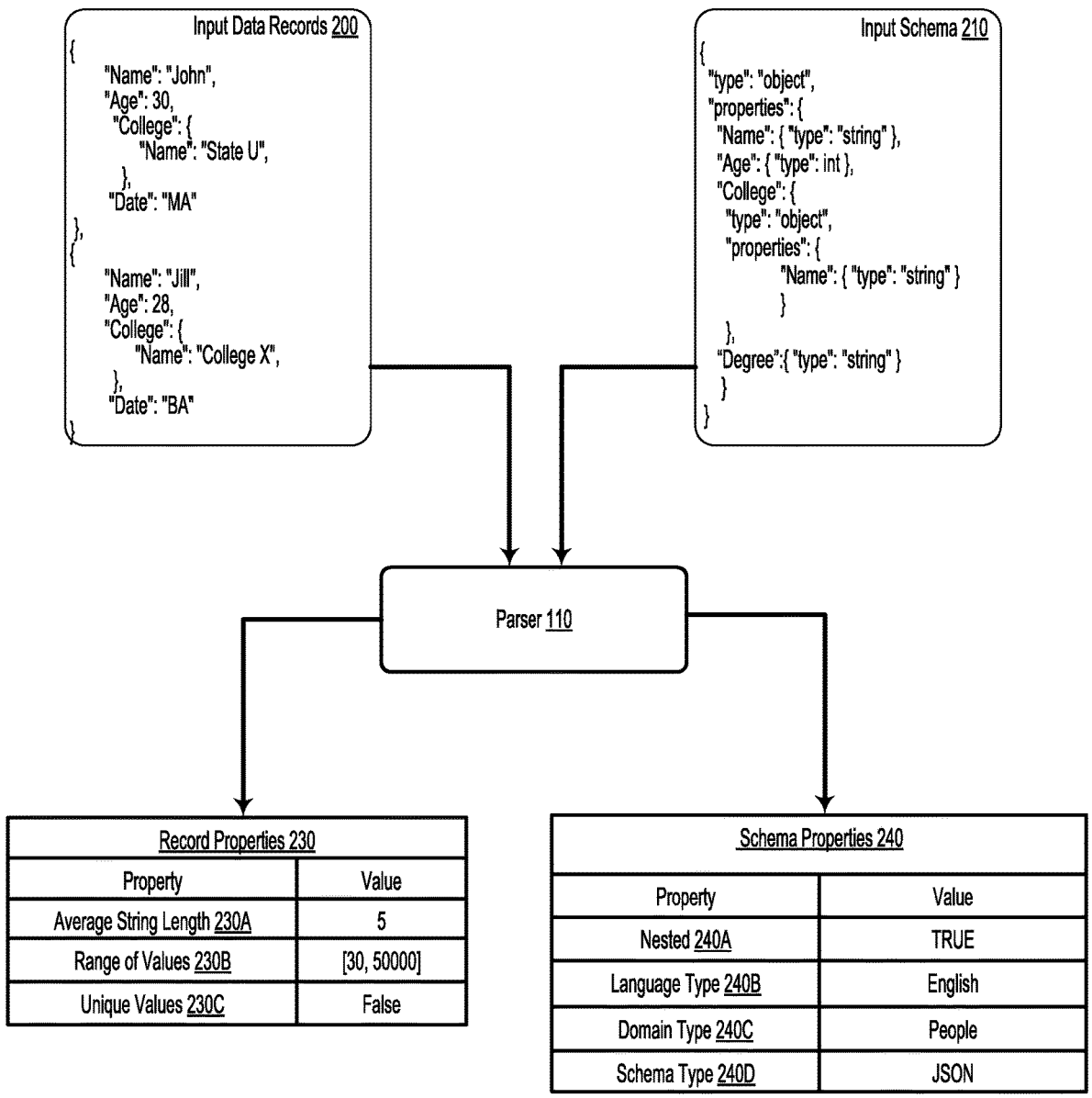
FIG. 2 illustrates record properties and schema properties, in accordance with example embodiments.

To conceptually illustrate record properties and schema properties, FIG. 2 is provided. Specifically, FIG. 2 shows how parser 110 receives input data records 200 and input schema 210 and then responsively analyzes input data records 200 and input schema 210 to determine record property values for record properties 230 and schema property values for schema properties 240.

Record properties 230 include properties that are exhibited by input data records 200. As such, the record property value for a particular record property may be indicative of the extent to which input data records 200 exhibit the particular record property. In examples, record properties 230 may include average string length property 230A, range of values property 230B, and unique values property 230C. The record property values associated with record properties 230 may be character strings, numbers, Boolean values, or null values, as well as objects or arrays. For example, the record property value associated with average string length property 230A may be a number, the record property value associated with range of values property 230B may be an array, and the record property value associated with unique values property 230C may be a Boolean value.

In some examples, a user may provide record properties 230 to parser 110 before parser 110 performs operations on input data records 200. When providing record properties 230 to parser 110, a user may configure parser 110 with instructions on which elements in input data records 200 to locate and what data to extract from those located elements in order to determine the record property values for record properties 230.

Accordingly, during operation, parser 110 may analyse input data records 200 to determine the record property values associated with record properties 230. For example, to obtain the record property value for average string length property 230A, parser 110 may (i) locate all records in input data records 200 that have a string data type and (ii) calculate the average length of all located records that have a string data type. As another example, to obtain the record property value for range of values property 230B, parser 110 may (i) locate all records in input data records 200 that have an integer or float data type and (ii) calculate a mathematical range for all located records that have an integer or float data type. As yet another example, to obtain the record property value for unique values property 230C, parser 110 may (i) locate all records in input data records 200 and (ii) determine whether any of the located records are duplicates.

Note that record properties 230 are presented for the purpose of example and are not intended to be limiting with respect to the embodiments herein. Other record properties may also exist.

Schema properties 240 include properties that may be exhibited by input schema 210. As such, the schema property value for a particular schema property may be indicative of the extent to which input schema 210 exhibits the particular schema property. In examples, schema properties 240 include nested property 240A, language type property 240B, domain type property 240C, and schema type property 240D. Like the record property values, the schema property values associated with schema properties 240 may be character strings, numbers, Boolean values, or null values, as well as objects or arrays. For example, the schema property value associated with nested property 240A may be a Boolean value, the schema property value associated with language type property 240B may be a string, the schema property value associated with domain type property 240C may be a string, and the schema property value associated with schema type property 240D may also be a string.

In some examples, a user may provide schema properties 240 to parser 110 before parser 110 performs operations on input schema 210. When providing schema properties 240 to parser 110, a user may configure parser 110 with instructions on which elements in input schema 210 to locate and what data to extract from those located elements in order to determine the schema property values for schema properties 240.

Accordingly, during operation, parser 110 may analyse input schema 210 to determine the schema property values associated with schema properties 240. For example, to obtain the schema property value for nested property 240A, parser 110 may (i) locate all fields in input schema 210 and (ii) determine whether any of the located fields are associated with an object data type. As another example, to obtain the schema property value for language type property 240B, parser 110 may (i) locate all fields in input schema 210 and (ii) apply a natural language processing model on the located fields to determine the most likely language associated with input schema 210. As yet another example, to obtain the schema property value for domain type property 240C, parser 110 may (i) locate all fields in input schema 210 and (ii) apply a natural language processing model on the located fields to determine the most likely subject domain associated with input schema 210. As one more example, to obtain the schema property value for schema type property 240D, parser 110 may (i) locate all fields in input schema 210 and (ii) apply a trained machine learning model on the located fields to determine the most likely schema type associated with input schema 210.

Note that schema properties 240 are used for the purpose of example and are not intended to be limiting with respect to the embodiments herein. Other schema properties may also exist.

Schema matching engine 120 may contain a plurality of schema mapping techniques for transforming data records from being structured in accordance with a first schema to being structured in accordance with a second schema. Additionally, schema matching engine 120 may contain a set of assignment rules, where each assignment rule in the set of assignment rules suggests at least one schema mapping technique from the plurality of schema mappings techniques based on (i) schema properties that are exhibited by the first schema and the second schema and/or (ii) record properties that are exhibited by first data records structured in accordance with the first schema and second data records structured in accordance with the second schema.

Figure 3:
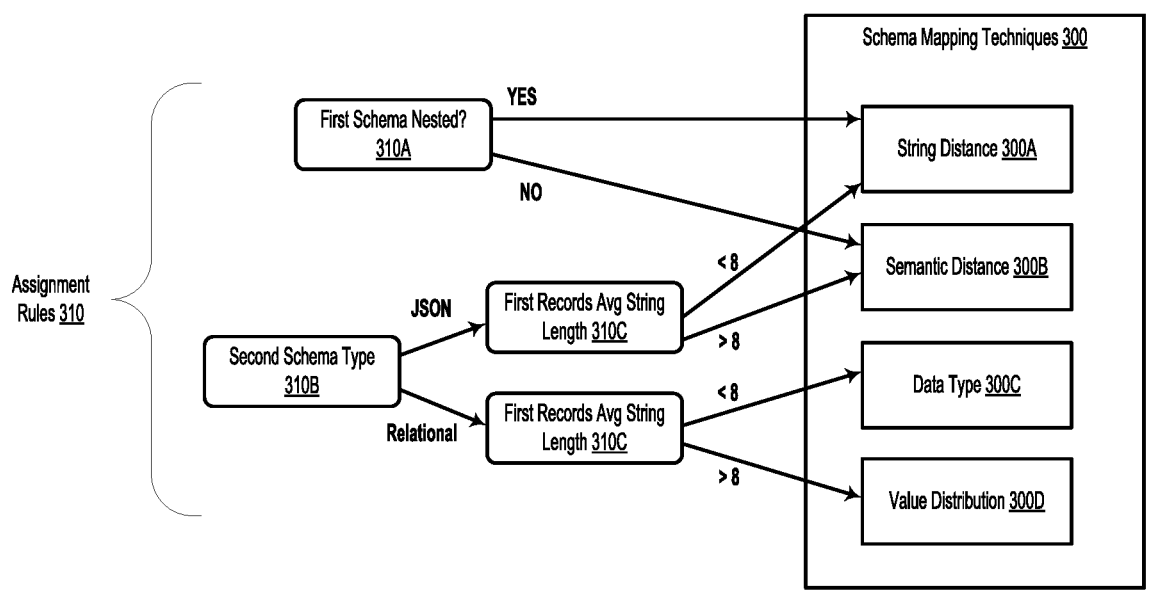
FIG. 3 illustrates assignment rules and schema mapping techniques, in accordance with example embodiments.

To conceptually illustrate assignment rules and schema mapping techniques, FIG. 3 is provided. Specifically, FIG. 3 illustrates how assignment rules 310 can utilize the schema properties and record properties determined by parser 110 to select a schema mapping technique from schema mapping techniques 300.

Schema mapping techniques 300 may transform data records from one schema to another. Each technique in schema mapping techniques 300 may use a different methodology to perform the transformation. In example embodiments, schema mapping techniques 300 include string distance technique 300A, semantic distance technique 300B, data type technique 300C, and value distribution technique 300D. However, other schema mapping techniques are also possible and contemplated in the disclosure herein. Furthermore, schema mapping techniques 300 may be extensible such that new schema mapping techniques can be added to schema mapping techniques 300. In examples, adding a new schema mapping technique to schema mapping techniques 300 may involve configuring assignment rules 310 so that at least some combination of schema properties or record properties determined by parser 110 suggest the new schema mapping technique.

String distance technique 300A may transform data records from one schema to another by calculating string similarity scores between field names in the first schema and field names in the second schema. For example, if the first schema had a field titled "Tree" and the second schema had a field titled "Trees" and another field titled "Chicago", then string distance technique 300A may be more disposed to transform data records from "Tree" to "Trees" rather than from "Tree" to "Chicago" because "Tree" has a greater string similarity to "Trees" than to "Chicago".

Semantic distance technique 300B may transform data records from one schema to another by calculating a semantic similarity score between field names in the first schema and field names in the second schema. For example, if the first schema had a field titled "Trees" and the second schema had a field titled "Treasure" and another field titled "Forest", then semantic distance technique 300B may be more disposed to transform data records from "Trees" to "Forest" rather than from "Trees" to "Treasure" because "Trees" has a greater semantic similarity to "Forest" than to "Treasure".

Data type technique 300C may transform data records from one schema to another by calculating a data type similarity score between fields in the first schema and fields in the second schema. For example, if the first schema had a field with an integer data type and the second schema had a field with a float data type and another field with a timestamp data type, then data type technique 300C may be more disposed to transform records from the field with an integer data type to the float data type rather than to the timestamp data type because an integer has a greater data type similarity to a float than to a timestamp.

Value distribution technique 300D may transform first data records from one schema to another by calculating a value similarity score between values of the first data records and representative second data records that are structured in accordance with the second schema. For example, if the first data records had a field with values that have a mean of 102 and the second data records had a field with values that have a mean of 100 and another field with values that have a mean of 400, then value distribution technique 300D may be more disposed to transform data records from the field values that have a mean of 102 to the field with values that have a mean of 100 rather than to the field with values that have a mean of 400 because 102 has a greater value similarity score to 100 than to 400.

Assignment rules 310 may assist schema matching engine 120 with selecting one or more schema mapping techniques from schema mapping techniques 300. In particular, a given assignment rule from assignment rules 310 may evaluate the schema properties or record properties determined by parser 110 to suggest one or more schema mapping techniques from schema mapping techniques 300. Assignment rules 310 may be evaluated independently or in conjunction to suggest one or more schema mapping techniques. In example embodiments, assignment rules 310 include first schema nested rule 310A, second schema type rule 310B, and first records average string length rule 310C. However, other assignment rules are also possible and contemplated in the disclosure herein.

First schema nested rule 310A is an example of an independently evaluated rule. This rule may utilize nested property 240A from schema properties 240 to determine which schema mapping technique from schema mapping techniques 300 to suggest. For instance, if the schema property value associated with nested property 240A indicates that the first schema is nested (e.g., has a field associated with an object data type), then first schema nested rule 310A may suggest string distance technique 300A. Otherwise, if the schema property value associated with nested property 240A indicates that the first schema is not nested, then first schema nested rule 310A may suggest semantic distance technique 300B.

Second schema type rule 310B and first records average string length rule 310C are examples of conjunctively evaluated rules. These rules may utilize average string length property 230A from record properties 230 and schema type property 240A from schema properties 240 to determine which schema mapping technique from schema mapping techniques 300 to suggest.

For instance, if the schema property value associated with schema type property 240A indicates that the second schema is a JavaScript Object Notation (JSON) schema and the record property value associated with average string length property 230A indicates that the first data records have an average string length of less than 8, then second schema type rule 310B and first records average string length rule 310C may suggest string distance technique 300A. Otherwise, if the schema property value associated with schema type property 240A indicates that the second schema is a JSON schema and the record property value associated with average string length property 230A indicates that the first data records have an average string length greater than 8, then second schema type rule 310B and first records average string length rule 310C may suggest semantic distance technique 300B.

Alternatively, if the schema property value associated with schema type property 240A indicates that second schema is a relational schema and the record property value associated with average string length property 230A indicates that the first data records have an average string length of less than 8, then second schema type rule 310B and first records average string length rule 310C may suggest data type technique 300C. Otherwise, if the schema property value associated with schema type property 240A indicates that the second schema is a relational schema and the record property value associated with average string length property 230A indicates that the first data records have an average string length greater than 8, then second schema type rule 310B and first records average string length rule 310C may suggest value distribution technique 300D.

Note that while assignment rules 300 are represented as decision trees, this is solely for the purpose of example and is not intended to be limiting with respect to the embodiments herein. In other examples, assignment rules 300 may take the form of a predictive model. The predictive model may include, but is not limited to: an artificial neural network, a Bayesian network, a hidden Markov model, a Markov decision process, a logistic regression function, a support vector machine, a statistical machine learning algorithm, and/or a heuristic machine learning system. The predictive models may be designed to take as input the record property values for record properties 230 and the schema property values for schema properties 240 and may correspondingly output one or more schema mapping techniques from schema mappings techniques 310 that are appropriate for transforming data records from being structured in accordance with a first schema to being structured in accordance with a second schema.

Furthermore, assignment rules 300 may be configured to suggest a schema mapping technique from schema mapping techniques 300 based on one or more prior schema transformations performed by schema matching engine 120. For example, suppose schema matching engine 120 utilized semantic distance technique 300B to transform data records from being structured in accordance with schema A to being structured in accordance with schema B. Then, at a later point in time, suppose schema matching engine 120 is tasked with transforming data records from being structured in accordance with schema C to being structured in accordance with schema D. If schema matching engine 120 determines that (i) the schema properties associated with schema C are similar (e.g., have the same value, are within a threshold value from each other, or, if the schema properties are represented as vectors, are within a threshold cosine similarity (above 0.9) or Jaccard similarity from each other) to the schema properties associated with schema A and (ii) the schema properties associated with schema D are similar to the schema properties associated with schema B, then assignment rules 300 within schema matching engine 120 may be configured to suggest the same schema mapping techniques utilized for transforming data records from schema A to schema B (in this scenario, semantic distance technique 300B) as the schema mapping techniques for transforming data records from schema C to schema D.

Figure 4A:
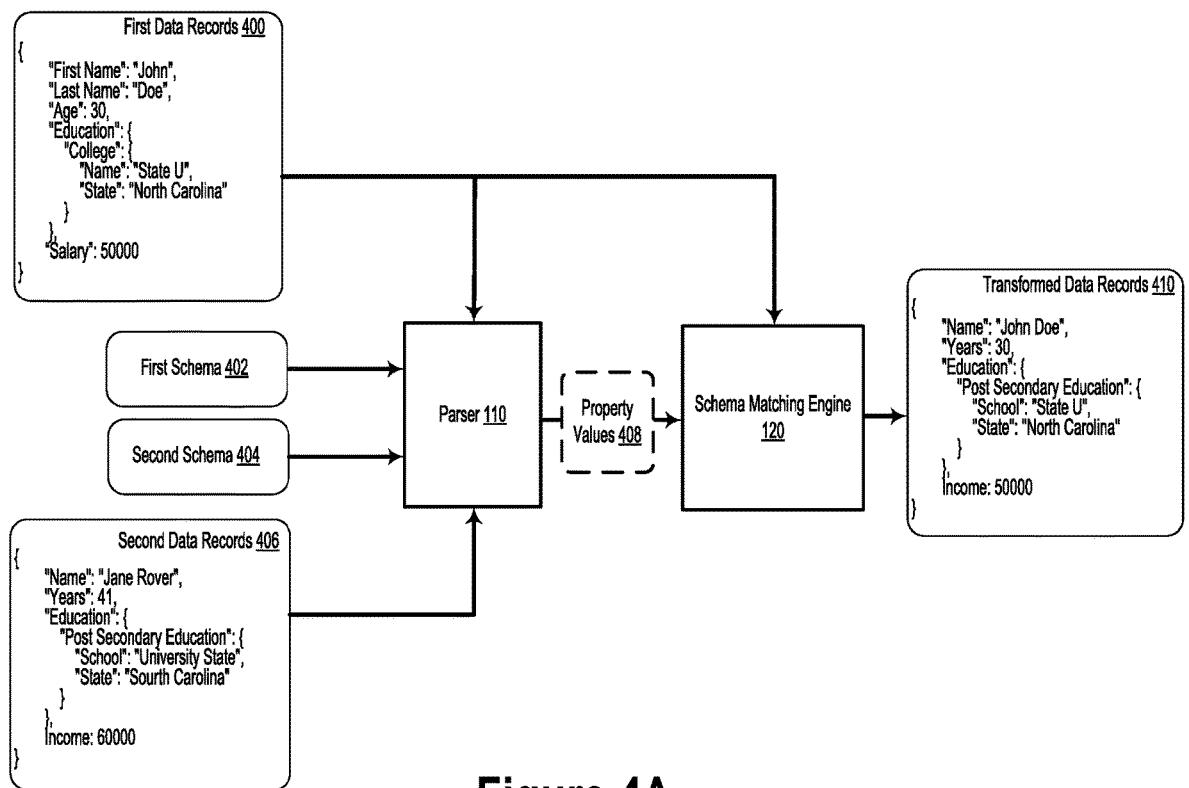
FIGS. 4A, 4B, and 4C illustrate the relationships between a parser and a schema matching engine, in accordance with example embodiments.
Figure 4B:
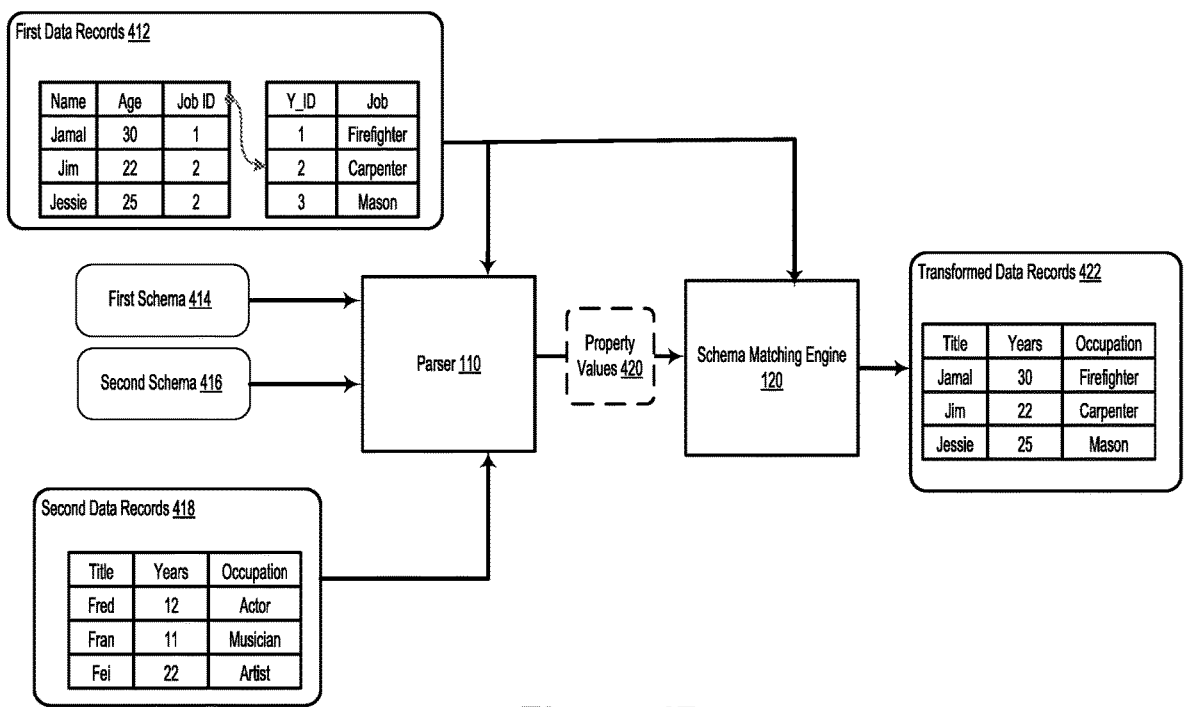
Figure 4C:
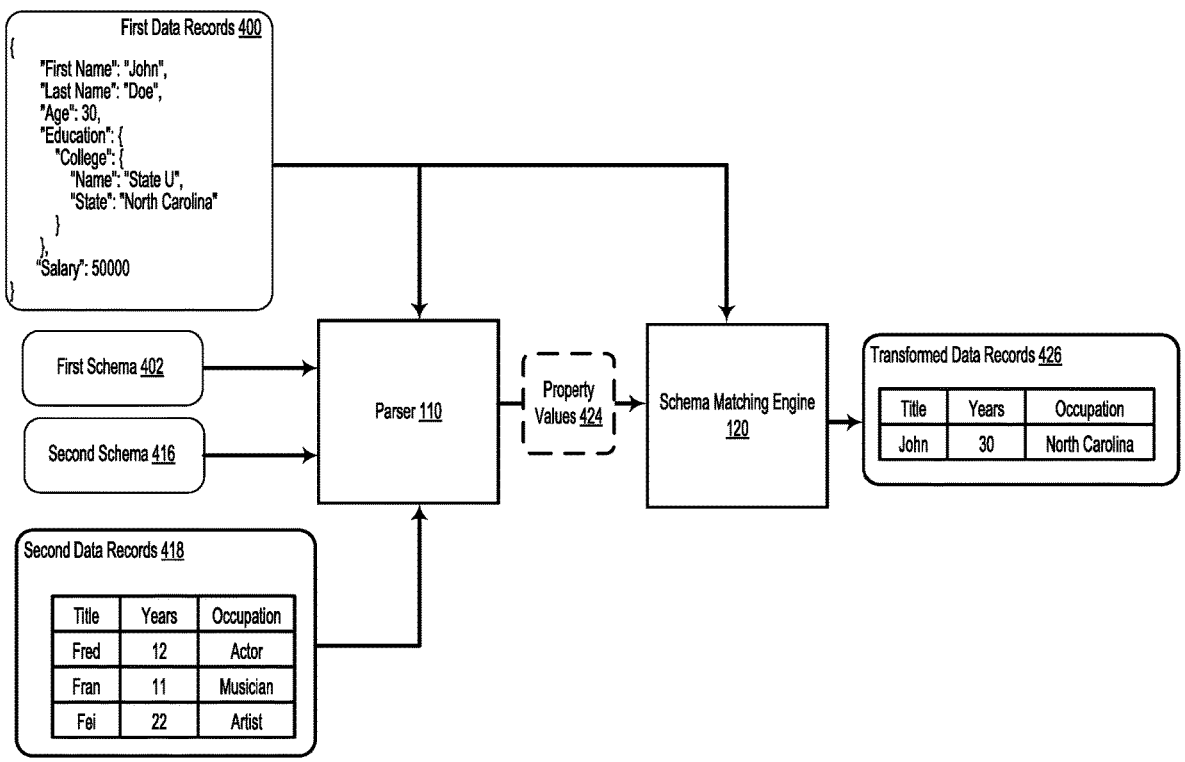

FIGS. 4A, 4B, and 4C illustrate relationships between parser 110 and schema matching engine 120, in accordance with example embodiments. In particular, FIGS. 4A, 4B, and 4C are provided to illustrate how schema matching engine 120: (i) receives first data records structured in accordance with a first schema, (ii) receives record property values and schema property values from parser 110, and (iii) using the record property values and/or schema property values, selects one or more schema mapping techniques to transform the first data records from being structured in accordance with the first schema to being structured in accordance with a second schema.

FIG. 4A illustrates how schema matching engine 120 receives first data records 400 and property values 408 and then responsively transforms first data records 400 into transformed data records 410, where transformed data records 410 have the same schema (i.e., second schema 404) as second data records 406.

First data records 400 are structured in accordance with first schema 402. For the purpose of brevity, the contents of first schema 402 are not shown, but first schema 402 may be a JSON encoded schema. In general, JSON is a hierarchical nesting of objects and arrays. A JSON object is an unordered set of key/value pairs that begins with a left brace ("{") and ends with a right brace ("}"), where the keys may correspond to fields and the values may correspond to entries for those fields. The values may be character strings, numbers, Boolean values, or null values, as well as objects or arrays. JSON arrays are ordered sets of values that begin with a left bracket ("[") and end with a right bracket ("]"). The values in an array are separated by commas.

Second data records 406 are structured in accordance with second schema 404. For the purpose of brevity, the contents of second schema 404 are not shown, but second schema 404 may also be a JSON encoded schema. However, second schema 404 may differ from first schema 402. For instance, first data records 400 are shown to have the keys "First Name" and "Last Name", whereas second data records 406 are shown to have the key "Name". This inconsistency is an example of the difference between first schema 402 and second schema 404.

Parser 110 may be configured to analyze first data records 400 and second data records 406 to determine the record property values associated with record properties 230. In particular, parser 110 may analyze first data records 400 determine first record property values associated with record properties 230, where the first record property values are indicative of the extent to which first data records 400 exhibit record properties 230. Parser 110 may also analyze second records 406 to determine second record property values associated with record properties 230, where the second record property values are indicative of the extent to which second data records 406 exhibit record properties 230. As an example, to obtain a first record property value for range of values property 230B, parser 110 may (i) locate all records in first data record 400 that have an integer or float data type and (ii) calculate a mathematical range for all located records that have an integer or float data type.

Parser 110 may also be configured to analyze first schema 402 and second schema 404 to determine schema property values associated with schema properties 240 as well or instead. In particular, parser 110 may analyze first schema 402 determine first schema property values associated with schema properties 240, where the first schema property values are indicative of the extent to which first schema 402 exhibits schema properties 240. Parser 110 may also analyze second schema 404 to determine second schema property values associated with schema properties 240, where the second schema property values are indicative of the extent to which second schema 404 exhibits schema properties 240. As an example, to obtain a second schema property value for nested property 240A, parser 110 may (i) locate all fields in second schema 404 and (ii) determine whether any of the located fields are associated with an object data type.

After analyzing first data records 400, second data records 406, first schema 402 and second schema 404, parser 110 may provide the determined record property values associated with record properties 230 and the determined schema property values associated with schema properties 240 to schema matching engine 120 in the form of property values 408.

Schema matching engine 120 may receive property values 408 from parser 110 and may use property values 408 along with assignment rules 310 to select one or more schema mapping techniques to transform first data records 400 into transformed data records 410. In this example, the keys in first data records 400 have similar string names to the keys in second data records 406. For instance, second data records 406 use the keys "Name", "Education", and "State" and first data records 400 use the keys "First Name", "Last Name", "Education", and "State". Assignment rules 310 may ascertain this string similarity and may cause schema matching engine 120 to select string distance technique 300A to transform first data records 400 into transformed data records 410.

FIG. 4B illustrates how schema matching engine 120 receives first data records 412 and property values 420 and then responsively transforms first data records 412 into transformed data records 422, where transformed data records 422 have the same schema as second data records 418.

First data records 412 are structured in accordance with first schema 414. For the purpose of brevity, the contents of first schema 414 are not shown, but first schema 414 may be a relational schema. In general, a relational schema organizes data records into a series of interconnected tables. A table contains columns and rows. The rows of a table correspond to individual entries, while the columns correspond to fields of those individual entries. Entries may be character strings, numbers, Boolean values, or null values.

Second data records 418 are structured in accordance with second schema 416. For the purpose of brevity, the contents of second schema 416 are not shown, but second schema 416 may also be a relational schema. However, second schema 416 may differ from first schema 414. For instance, first data records 412 are shown to be structured over two tables whereas second data records 418 are shown to be structured over just a single table. Further, first data records 412 are shown to have the attribute "Name", whereas second data records 418 are shown to have the attribute "Title". These inconsistencies are examples of the difference between first schema 414 and second schema 416.

Similar to FIG. 4A, parser 110 may be configured to analyze first data records 412 and second data records 418 to determine the record property values associated with record properties 230. Parser 110 may also be configured to analyze first schema 414 and second schema 416 to determine schema property values associated with schema properties 240 as well or instead. After analyzing first data records 412, second data records 418, first schema 414 and second schema 416, parser 110 may provide the determined record property values associated with record properties 230 and the determined schema property values associated with schema properties 240 to schema matching engine 120 in the form of property values 420.

Schema matching engine 120 may receive property values 420 from parser 110 and may use property values 420 along with assignment rules 310 to select one or more schema mapping techniques to transform first data records 412 into transformed data records 422. In this example, the columns in first data records 412 have semantically similar names with the columns in second data records 418. For instance, second data records 418 use the column names "Title", "Years", and "Occupation" and first data records 412 use the column names "Name", "Age", and "Job". Assignment rules 310 may ascertain this semantic similarity and may cause schema matching engine 120 to select semantic distance technique 300B to transform first data records 412 into transformed data records 422.

FIG. 4C illustrates how schema matching engine 120 receives first data records 400 and property values 424 and then responsively transforms first data records 400 into transformed data records 426, where transformed data records 426 have the same schema as second data records 418.

First data records 400 were previously discussed in FIG. 4A and are structured in accordance with first schema 402. Second data records 450 were previously discussed in FIG. 4B and are structured in accordance with second schema 416. Second schema 416 may be different from first schema 402. For instance, first data records 400 are shown to be structured in accordance with a JSON schema whereas second data records 418 are shown to be structured in accordance with a relational schema. Further, first data records 400 are shown to have the attributes "First Name" and "Last Name", whereas second data records 418 are shown to have the attribute "Title". These inconsistencies are examples of the difference between first schema 402 and second schema 416.

Similar to FIGS. 4A and 4B, parser 110 may analyze first data records 400 and second data records 418 to determine the record property values associated with record properties 230. Parser 110 may also analyze first schema 402 and second schema 416 to determine schema property values associated with schema properties 240 as well or instead. After analyzing first data records 400, second data records 418, first schema 402, and second schema 416, parser 110 may provide the determined record property values associated with record properties 230 and the determined schema property values associated with schema properties 240 to schema matching engine 120 in the form of property values 424.

Schema matching engine 120 may receive property values 424 from parser 110 and may use property values 424 along with assignment rules 310 to select one or more schema mapping techniques to transform first data records 400 into transformed data records 426. In this example, the keys in first data records 400 have semantically similar names with the columns in second data records 418. For instance, second data records 418 use the column names "Title", "Years", and "Occupation" and first data records 412 use the key names "First Name" and "Age" Assignment rules 310 may ascertain this semantic similarity and may cause schema matching engine 120 to select semantic distance technique 300B to transform first data records 400 to transformed data records 426.

III. Example Methods

Figure 5:
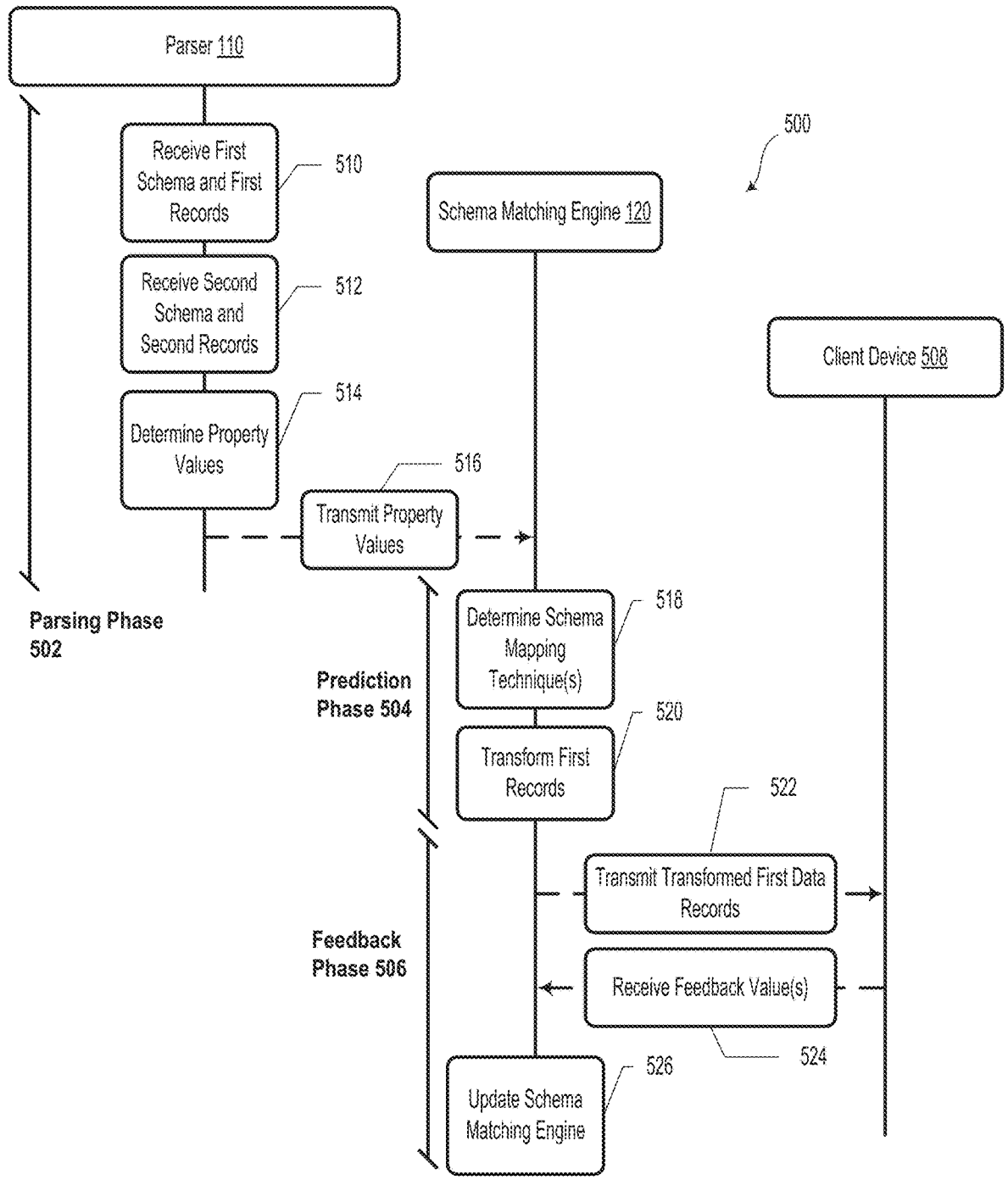
FIG. 5 depicts a message flow, in accordance with example embodiments.

FIG. 5 depicts message flow 500, in accordance with example embodiments. Message flow 500 can be logically divided into three phases: parsing phase 502, in which parser 110 receives and parses through first and second schemas and first and second data records, prediction phase 504, in which schema matching engine 120 determines one or more schema mapping techniques and then transforms the first data records in accordance with the one or more determined schema mapping techniques, and feedback phase 506, in which client device 508 provides feedback on the transformation made by schema matching engine 120 in prediction phase 504. By way of example, message flow 500 may utilize parser 110, schema matching engine 120, and client device 508 during operation. However, additional components, steps, or blocks, may be added to message flow 500 without departing from the scope of this disclosure.

At block 510, parser 110 receives (i) a first schema and (ii) first data records structured in accordance with the first schema. In some embodiments, parser 110 may determine the first schema by parsing through the first data records. In some embodiments, parser 110 receives the first schema and the first data records from client device 508. For example, parser 110 may prompt client device 508 to enter the appropriate data for the first schema and the first data records. This may be accomplished by way of a web page or series of web pages hosted by parser 110 and provided to client device 508 upon request. Alternatively, parser 110 may receive the first schema and the first data records from another device, such as a database device or a cloud-based computing device.

At block 512, parser 110 receives (i) a second schema and (ii) second data records structured in accordance with the second schema. As similarly described in block 510, parser 110 may determine the second schema by parsing through the second data records. As also similarly described in block 510, parser 110 may receive the second schema and the second data records from client device 508. Alternatively, parser 110 may receive the second schema and the second data records from another device, such as a database device or a cloud-based computing device.

Since schema matching engine 120 may be configured to transform the entirety of the first data records and not the second data records, in some embodiments, the number of second data records may be smaller than the number of first data records.

At block 514, parser 110 determines record property values for one or more pre-defined record properties and schema property values for one or more pre-defined schema properties. For example, parser 110 may analyze the first data records to determine first record property values associated with record properties 230 and may analyze the second data records to determine second record property values associated with record properties 230. As another example, parser 110 may analyze the first schema to determine first schema property values associated with schema properties 240 and may analyze the second schema to determine second schema property values associated with schema properties 240.

At block 516, parser 110 transmits (i) the first schema property values, (ii) the second schema property values, (iii) the first record property values, and (iv) the second record property values to schema matching engine 120. Parser 110 may additionally transmit the first data records to schema matching engine 120.

At block 518, schema matching engine 120 utilizes the property values received from parser 110 at block 516 to determine one or more schema mapping techniques from a library of schema mapping techniques contained within schema matching engine 120. As described with respect to FIG. 3, schema matching engine 120 may use one or more assignment rules/predictive models to determine the one or more schema mapping techniques. These predictive models may include, but are not limited to: artificial neural networks, Bayesian networks, hidden Markov models, Markov decision processes, a logistic regression functions, support vector machines, decision trees, statistical machine learning algorithms, and/or heuristic machine learning systems.

At block 520, schema matching engine 120 uses the one or more schema mapping techniques determined in block 518 to transform the first data records from being structured in accordance with the first schema to being structured in accordance with the second schema.

In some embodiments, schema matching engine 120 may use different schema mapping techniques on different portions of the first data records. For example, the first data records may contain a first plurality of first data records and a second plurality of first data records, where the second plurality is different than the first plurality. In some cases, the second plurality of first data records may be nested within the first plurality of first data records. In such embodiments, schema matching engine 120 may transform the first plurality of first data records in accordance with a first schema mapping technique from the one or more schema mapping techniques determined in block 518 and may transform the second plurality of first data records in accordance with a second schema mapping technique from the one or more schema mapping techniques determined in block 518. For example, schema matching engine 120 may transform the first plurality of first data records using string distance technique 300A and may transform the second plurality of first data records using value distribution technique 300D.

In some embodiments, after the transformation, schema matching engine 120 may store the transformed first data records into persistent storage, where data records stored in the persistent storage are structured in accordance with the second schema.

At block 520, schema matching engine 120 provides transformed first data records to client device 508 in a data structure in accordance with the second schema. Providing the transformed first data records may involve, for example, generating one or more graphical user interfaces (GUIs) that contain representations of the transformed first data records and providing the one or more GUIs to client device 508.

At block 524, schema matching engine 120 may receive feedback values from client device 508 about the transformation made at block 520. Receiving feedback may be accomplished, for example, by a GUI provided by schema matching engine 120 (perhaps via network interface 140) to client device 508. The GUI may include feature(s) for providing feedback to schema matching engine 120. For instance, the GUI may contain data entry fields that allow client device 508 to rank the transformation made at block 520. As an example, client device 508 may provide a ranking from 1-10, where a high ranking (e.g., 9 or 10) corresponds to a satisfactory transformation at block 520 (e.g., the transformed first data records closely adhere to the second schema) and a low ranking (e.g., 1 or 2) corresponds to an unsatisfactory transformation at block 520 (e.g., the transformed first data records do not closely adhere to the second schema).

In some embodiments, client device 508 provides multiple feedback values for different sections of the transformed first data records. For example, the transformed first data records may include a first group of transformed first data records and a second group of transformed first data records, wherein the first group is different than the second group. As such, client device 508 may provide a first feedback value that indicates an extent to which the first group of transformed first data records adhere to the second schema and a second feedback value that indicates an extent to which the second group of transformed first data records adhere to the second schema. Notably, other methods of providing feedback also exist.

At block 526, schema matching engine 120 may adjust assignment rules 300 based on the feedback received at block 524. For example, if (i) based on the analysis of the property values received at block 516, assignment rules 300 selected data type technique 300C as the schema mapping technique for block 520 and (ii) the feedback provided at block 524 was that client device 508 was unsatisfied with the transformation at block 520, then schema matching engine 120 may adjust assignment rules 300 such that, based on the analysis of the property values received at block 516, assignment rules 300 will select another schema mapping technique other than data type technique 300C. Other adjustments are also possible. In some embodiments, schema matching engine 120 may store the feedback provided by client device 508 into persistent storage for later use.

IV. Example Operations

Figure 6:
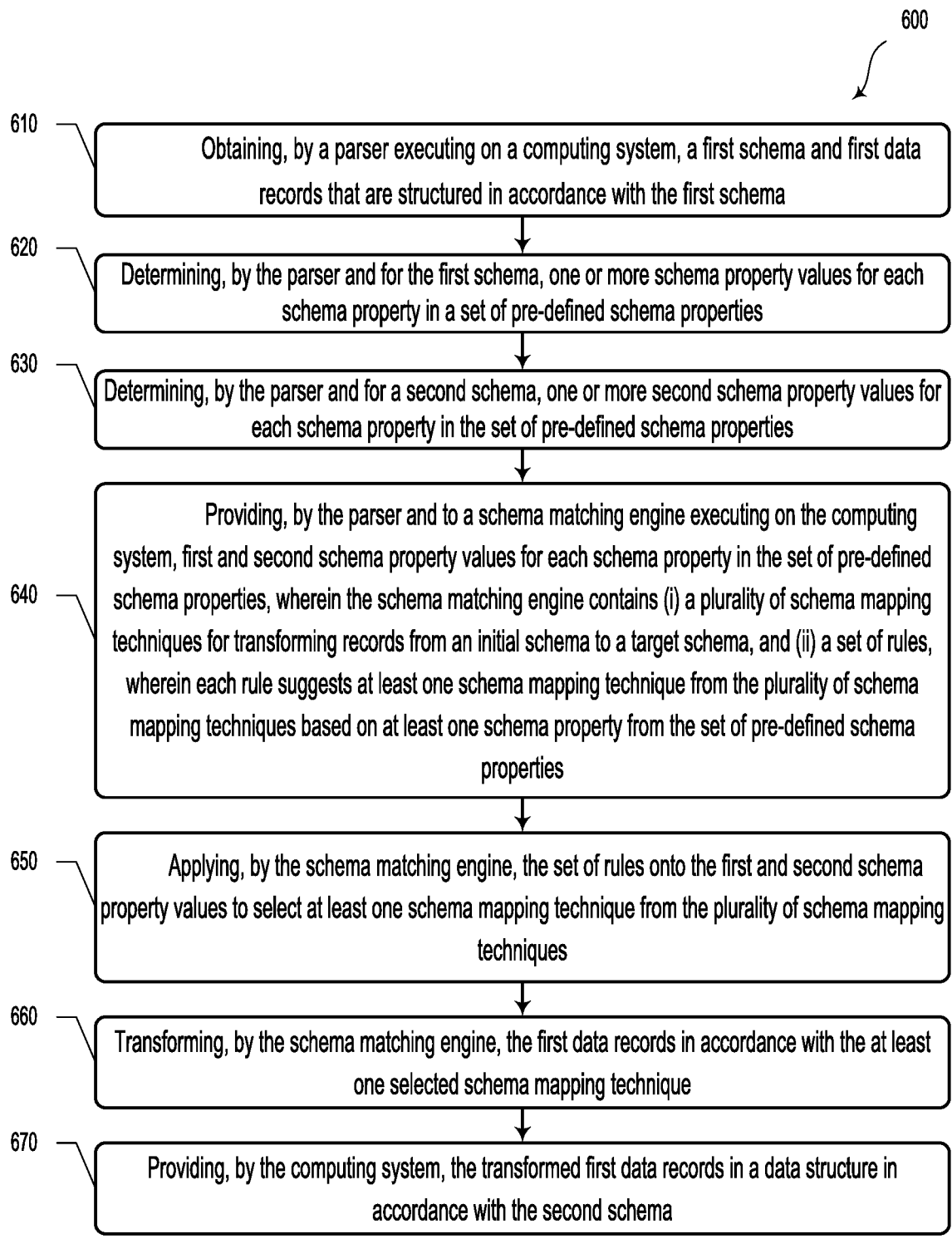
FIG. 6 illustrates a method, in accordance with example embodiments.

FIG. 6 illustrates a method 600, in accordance with example embodiments. Method 600 may include various blocks or steps. The blocks or steps may be carried out individually or in combination. The blocks or steps may be carried out in any order and/or in series or in parallel. Further, blocks or steps may be omitted or added to method 600. The blocks of method 600 may be carried out by various elements of computing system 100 as illustrated and described in reference to FIG. 1.

Block 610 may involve obtaining, by a parser executing on a computing system, a first schema and first data records that are structured in accordance with the first schema;

Block 620 may involve determining, by the parser and for the first schema, one or more first schema property values for each schema property in a set of pre-defined schema properties.

Block 630 may involve determining, by the parser and for a second schema, one or more second schema property values for each schema property in the set of pre-defined schema properties;

Block 640 may involve providing, by the parser and to a schema matching engine executing on the computing system, first and second schema property values for each schema property in the set of pre-defined schema properties. The schema matching engine may contains (i) a plurality of schema mapping techniques for transforming records from an initial schema to a target schema, and (ii) a set of rules. Each rule may suggests at least one schema mapping technique from the plurality of schema mapping techniques based on at least one schema property from the set of pre-defined schema properties.

Block 650 may involve applying, by the schema matching engine, the set of rules onto the first and second schema property values to select at least one schema mapping technique from the plurality of schema mapping techniques.

Block 660 may involve transforming, by the schema matching engine, the first data records in accordance with the at least one selected schema mapping technique.

Block 670 may involve providing, by the computing system, the transformed first data records in a data structure in accordance with the second schema. In some embodiments, a data structure may be a collection of data values, the relationships among the data values, and the function or operations that can be applied to the data values.

Some embodiments may involve receiving, by the parser, representative second data records that are structured in accordance with the second schema; determining, for the first data records, one or more first record property values for each record property in a set of pre-defined record properties; and determining, for the second data records, one or more second record property values for each record property in a set of pre-defined record properties. Such embodiments may further involve providing, by the parser and to the schema matching engine, first and second record property values for each record property in the set of pre-defined record properties, where the schema matching engine further contains a set of second rules and where each second rule suggests at least one schema mapping technique from the plurality of schema mappings techniques based on at least one record property from the set of pre-defined record properties. Such embodiments may even further involve applying, by the schema matching engine, the set of second rules onto the first and second record property values to select the at least one schema mapping technique.

In some embodiments, the number of representative second data records is smaller than the number of first data records.

Some embodiments involve storing, by the schema matching engine and into persistent storage, the transformed first data records, where data records stored in the persistent storage are structured in accordance with the second schema.

In some embodiments, the pre-defined record properties comprise a mathematical range property. In some embodiments, the pre-defined record properties comprise an average length property.

In some embodiments, providing the transformed first data records includes generating, by the computing system, one or more graphical user interfaces that contain representations of the transformed first data records and transmitting, by the computing system and to a client device, the one or more graphical user interfaces.

Some embodiments may involve receiving, from the client device, at least one feedback value indicating an extent to which the transformed first data records adhere to the second schema and storing, in a persistent storage, the at least one feedback value.

Some embodiments may involve, based on the at least one feedback value, updating, by the schema matching engine, the set of rules such that at least one rule suggests a different at least one schema mapping technique than previously suggested.

In some embodiments, the transformed first data records may include a first plurality of transformed first data records and a second plurality of transformed first data records. In such embodiments, the at least one feedback value may include a first feedback value that indicates an extent to which the first plurality of transformed first data records adhere to the second schema and the at least one feedback value may include a second feedback value that indicates an extent to which the second plurality of transformed first data records adhere to the second schema.

In some embodiments, the first data records may include a first plurality of first data records and a second plurality of first data records. In such embodiments, transforming the first data records in accordance with the at least one selected schema mapping technique may include transforming the first plurality of first data records in accordance with a first schema mapping technique of the at least one selected schema mapping technique and transforming the second plurality of first data records in accordance with a second schema mapping technique of the at least one selected schema mapping technique.

In some embodiments, the second plurality of first data records are nested within the first plurality of first data records.

In some embodiments, the pre-defined schema properties comprise a domain property. In some embodiments, the pre-defined schema properties comprise a schema type property.

In some embodiments, the plurality of schema mappings techniques comprise a string similarity mapping technique. In some embodiments, the plurality of schema mappings techniques comprise a distribution of values mapping technique. In some embodiments, the plurality of schema mappings techniques comprise a semantic similarity mapping technique.

Some embodiments may involve obtaining, by the parser, a third schema and third data records that are structured in accordance with the third schema, determining, by the parser and for the third schema, one or more third schema property values for each schema property in the set of pre-defined schema properties, and determining, by the parser and for a fourth schema, one or more fourth schema property values for each schema property in the set of pre-defined schema properties. Such embodiments may further involve providing, by the parser and to the schema matching engine, third and fourth schema property values for each schema property in the set of pre-defined schema properties and determining, by the schema matching engine, that (i) the third schema property values are similar to the first schema property values and (ii) the fourth schema property values are similar to the second schema property values. Such embodiments may further involve transforming, by the schema matching engine, the third data records in accordance with the at least one selected schema mapping technique and providing, by the computing system, the transformed third data records in a data structure in accordance with the fourth schema.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method comprising:
obtaining, by a parser executing on a computing system, a first schema and first data records that are structured in accordance with the first schema;
determining, by the parser and for the first schema, one or more first schema property values for each schema property in a set of pre-defined schema properties, wherein the set of pre-defined schema properties comprises a nested property and at least one other schema property, and wherein the one or more first schema property values comprises a first nested property value that indicates whether the first schema is nested;

determining, by the parser and for a second schema, one or more second schema property values for each schema property in the set of pre-defined schema properties;

providing, by the parser and to a schema matching engine executing on the computing system, the first and second schema property values for each schema property in the set of pre-defined schema properties, wherein the schema matching engine contains (i) a plurality of schema mapping techniques for transforming records from an initial schema to a target schema, the plurality of schema mapping techniques comprising at least a string distance technique and a semantic distance technique, and (ii) a set of rules, wherein each rule suggests at least one schema mapping technique from the plurality of schema mapping techniques based on at least one schema property from the set of pre-defined schema properties, wherein the set of rules comprises a first schema nested rule that suggests a schema mapping technique from among at least the string distance technique and the semantic distance technique based on the first nested property value;

applying, by the schema matching engine, the set of rules onto the first and second schema property values to select at least one schema mapping technique from the plurality of schema mapping techniques;

transforming, by the schema matching engine, the first data records in accordance with the at least one selected schema mapping technique; and providing, by the computing system, the transformed first data records in a data structure in accordance with the second schema.

2. The computer-implemented method of claim 1, further comprising:

receiving, by the parser, representative second data records that are structured in accordance with the second schema;

determining, by the parser and for the first data records, one or more first record property values for each record property in a set of pre-defined record properties;

determining, by the parser and for the second data records, one or more second record property values for each record property in a set of pre-defined record properties;

providing, by the parser and to the schema matching engine, first and second record property values for each record property in the set of pre-defined record properties, wherein the schema matching engine further contains a set of second rules, wherein each second rule suggests at least one schema mapping technique from the plurality of schema mappings techniques based on at least one record property from the set of pre-defined record properties; and applying, by the schema matching engine, the set of second rules onto the first and second record property values to select the at least one schema mapping technique.

3. The computer-implemented method of claim 2, wherein the number of representative second data records is smaller than the number of first data records.

4. The computer-implemented method of claim 2, further comprising:

storing, by the schema matching engine and into persistent storage, the transformed first data records, wherein data records stored in the persistent storage are structured in accordance with the second schema.

5. The computer-implemented method of claim 2, wherein the pre-defined record properties comprise a mathematical range property.

6. The computer-implemented method of claim 2, wherein the pre-defined record properties comprise an average length property.

7. The computer-implemented method of claim 1, wherein providing the transformed first data records comprises:

generating, by the computing system, one or more graphical user interfaces that contain representations of the transformed first data records; and transmitting, by the computing system and to a client device, the one or more graphical user interfaces.

8. The computer-implemented method of claim 7, further comprising:

receiving, from the client device, at least one feedback value indicating an extent to which the transformed first data records adhere to the second schema; and storing, in a persistent storage, the at least one feedback value.

9. The computer-implemented method of claim 8, further comprising:

based on the at least one feedback value, updating, by the schema matching engine, the set of rules such that at least one rule suggests a different at least one schema mapping technique than previously suggested.

10. The computer-implemented method of claim 8, wherein the transformed first data records comprise a first plurality of transformed first data records and a second plurality of transformed first data records, wherein the at least one feedback value comprises a first feedback value that indicates an extent to which the first plurality of transformed first data records adhere to the second schema, and wherein the at least one feedback value comprises a second feedback value that indicates an extent to which the second plurality of transformed first data records adhere to the second schema.

11. The computer-implemented method of claim 1, wherein the first data records comprise a first plurality of first data records and a second plurality of first data records, and wherein transforming the first data records in accordance with the at least one selected schema mapping technique comprises transforming the first plurality of first data records in accordance with a first schema mapping technique of the at least one selected schema mapping technique and transforming the second plurality of first data records in accordance with a second schema mapping technique of the at least one selected schema mapping technique.

12. The computer-implemented method of claim 11, wherein the second plurality of first data records are nested within the first plurality of first data records.

13. The computer-implemented method of claim 1, wherein the at least one other schema property comprises a domain type property.

14. The computer-implemented method of claim 1, wherein the at least one other schema property comprises a schema type property.

15. The computer-implemented method of claim 1, wherein the first schema nested rule suggests the string distance technique if the first nested property value indicates that the first schema is nested, and wherein the first schema nested rule suggests the semantic distance technique if the first nested property value indicates that the first schema is not nested.

16. The computer-implemented method of claim 1, wherein the plurality of schema mappings techniques further comprise a data type technique and a value distribution technique.

17. The computer-implemented method of claim 1, further comprising:
   obtaining, by the parser, a third schema and third data records that are structured in accordance with the third schema;
   determining, by the parser and for the third schema, one or more third schema property values for each schema property in the set of pre-defined schema properties;
   determining, by the parser and for a fourth schema, one or more fourth schema property values for each schema property in the set of pre-defined schema properties;
   providing, by the parser and to the schema matching engine, third and fourth schema property values for each schema property in the set of pre-defined schema properties;
   determining, by the schema matching engine, that (i) the third schema property values are similar to the first schema property values and (ii) the fourth schema property values are similar to the second schema property values;
   transforming, by the schema matching engine, the third data records in accordance with the at least one selected schema mapping technique; and
   providing, by the computing system, the transformed third data records in a data structure in accordance with the fourth schema.

18. A computing system, comprising:
   a parser;
   a schema matching engine containing (i) a plurality of schema mapping techniques for transforming records from an initial schema to a target schema, the plurality of schema mapping techniques comprising at least a string distance technique and a semantic distance technique, and (ii) a set of rules, wherein each rule suggests at least one schema mapping technique from the plurality of schema mappings techniques based on at least one schema property from a set of pre-defined schema properties; and
   one or more processors configured to cause the computing system to carry out operations comprising:
      obtaining, by the parser, a first schema and first data records that are structured in accordance with the first schema;
      determining, by the parser and for the first schema, one or more first schema property values for each schema property in the set of pre-defined schema properties, wherein the set of pre-defined schema properties comprises a nested property and at least one other schema property, and wherein the one or more first schema property values comprises a first nested property value that indicates whether the first schema is nested;
      determining, by the parser and for a second schema, one of more second schema property values for each schema property in the set of pre-defined schema properties;
      providing, by the parser and to the schema matching engine, the first and second schema property values for each schema property in the set of pre-defined schema properties;
      applying, by the schema matching engine, the set of rules onto the first and second schema property values to select at least one schema mapping technique from the plurality of schema mapping techniques, wherein the set of rules comprises a first schema nested rule that suggests a schema mapping technique from among at least the string distance technique and the semantic distance technique based on the first nested property value;
      transforming, by the schema matching engine, the first data records in accordance with the at least one selected schema mapping technique; and
      providing, by the computing system, the transformed first data records.

19. The computing system of claim 18, wherein the operations further comprise:
   receiving, by the parser, representative second data records that are structured in accordance with the second schema;
   determining, by the parser and for the first data records, one or more first record property values for each record property in a set of pre-defined record properties;
   determining, by the parser and for the second data records, one or more second record property values for each record property in a set of pre-defined record properties;
   providing, by the parser and to the schema matching engine, first and second record property values for each record property in the set of pre-defined record properties, wherein the schema matching engine further contains a set of second rules, wherein each second rule suggests at least one schema mapping technique from the plurality of schema mappings techniques based on at least one record property from the set of pre-defined record properties; and
   applying, by the schema matching engine, the set of second rules onto the first and second record property values to select the at least one schema mapping technique.

20. An article of manufacture including a non-transitory computer-readable medium, having stored thereon program instructions that, upon execution by one or more processors of a computing system, cause the computing system to carry out operations comprising:
   obtaining, by a parser executing on the computing system, a first schema and first data records that are structured in accordance with the first schema;
   determining, by the parser and for the first schema, one or more first schema property values for each schema property in a set of pre-defined schema properties, wherein the set of pre-defined schema properties comprises a nested property and at least one other schema property, and wherein the one or more first schema property values comprises a first nested property value that indicates whether the first schema is nested;
   determining, by the parser and for a second schema, one of more second schema property values for each schema property in the set of pre-defined schema properties;
   providing, by the parser and to a schema matching engine executing on the computing system, the first and second schema property values for each schema property in the set of pre-defined schema properties, wherein the schema matching engine contains (i) a plurality of schema mapping techniques for transforming records from an initial schema to a target schema, the plurality of schema mapping techniques comprising at least a string distance technique and a semantic distance technique, and (ii) a set of rules, wherein each rule suggests at least one schema mapping technique from the plurality of schema mappings techniques based on at least one schema property from the set of pre-defined schema properties, wherein the set of rules comprises a first schema nested rule that suggests a schema mapping technique from among at least the string distance technique and the semantic distance technique based on the first nested property value;

applying, by the schema matching engine, the set of rules onto the first and second schema property values to select at least one schema mapping technique from the plurality of schema mapping techniques;

transforming, by the schema matching engine, the first data records in accordance with the at least one selected schema mapping technique; and providing, by the computing system, the transformed first data records.

* * * * *